Feb. 19, 1963   D. E. MacDONALD   3,078,008
CONTAINER OF AND DISPENSER FOR CUT-FRUIT SECTIONS
Filed Aug. 17, 1959   3 Sheets-Sheet 2
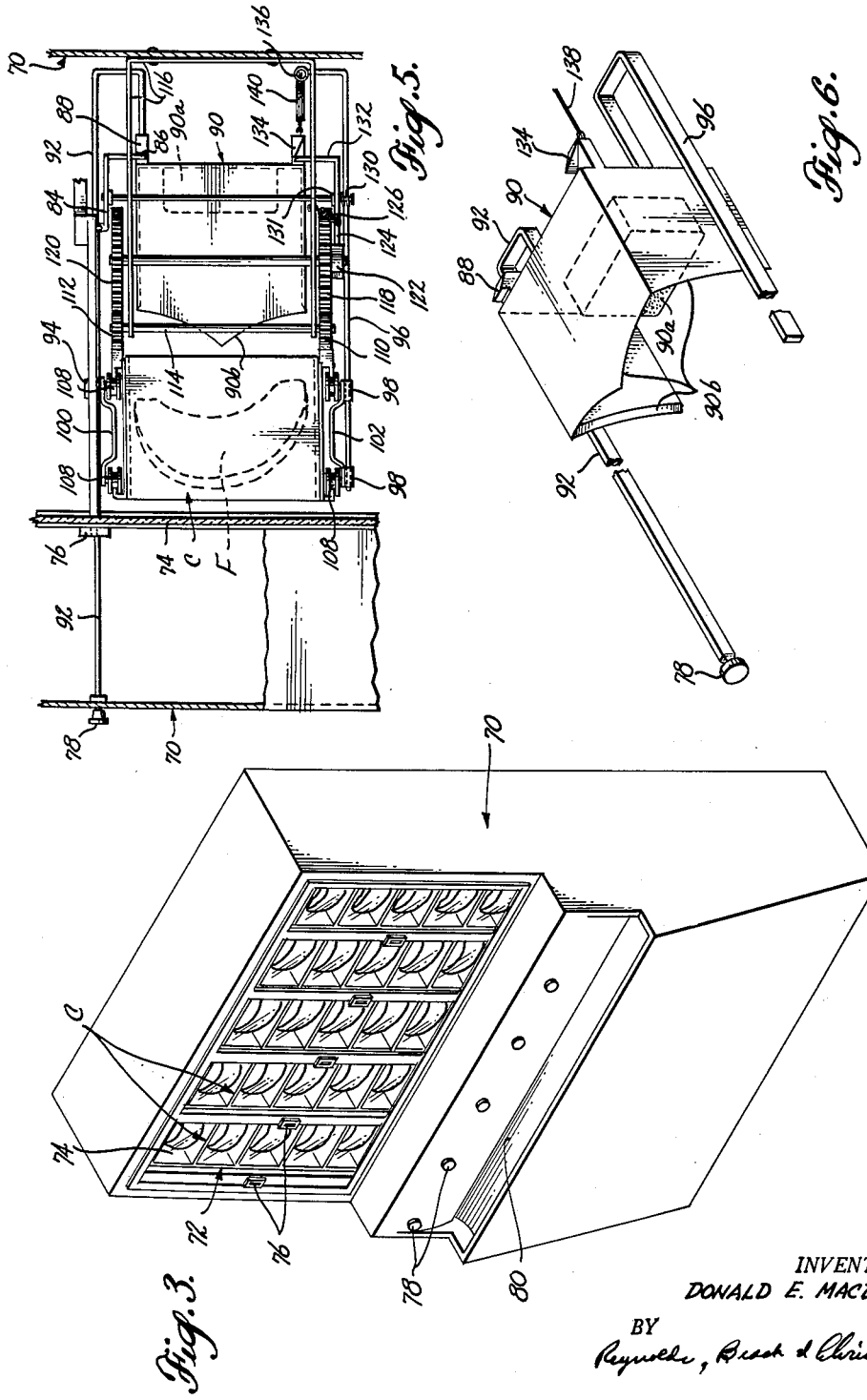
INVENTOR.
DONALD E. MACDONALD
BY
Reynolds, Beach & Christensen
ATTORNEYS Feb. 19, 1963 D. E. MacDONALD 3,078,008
CONTAINER OF AND DISPENSER FOR CUT-FRUIT SECTIONS
Filed Aug. 17, 1959 3 Sheets-Sheet 3
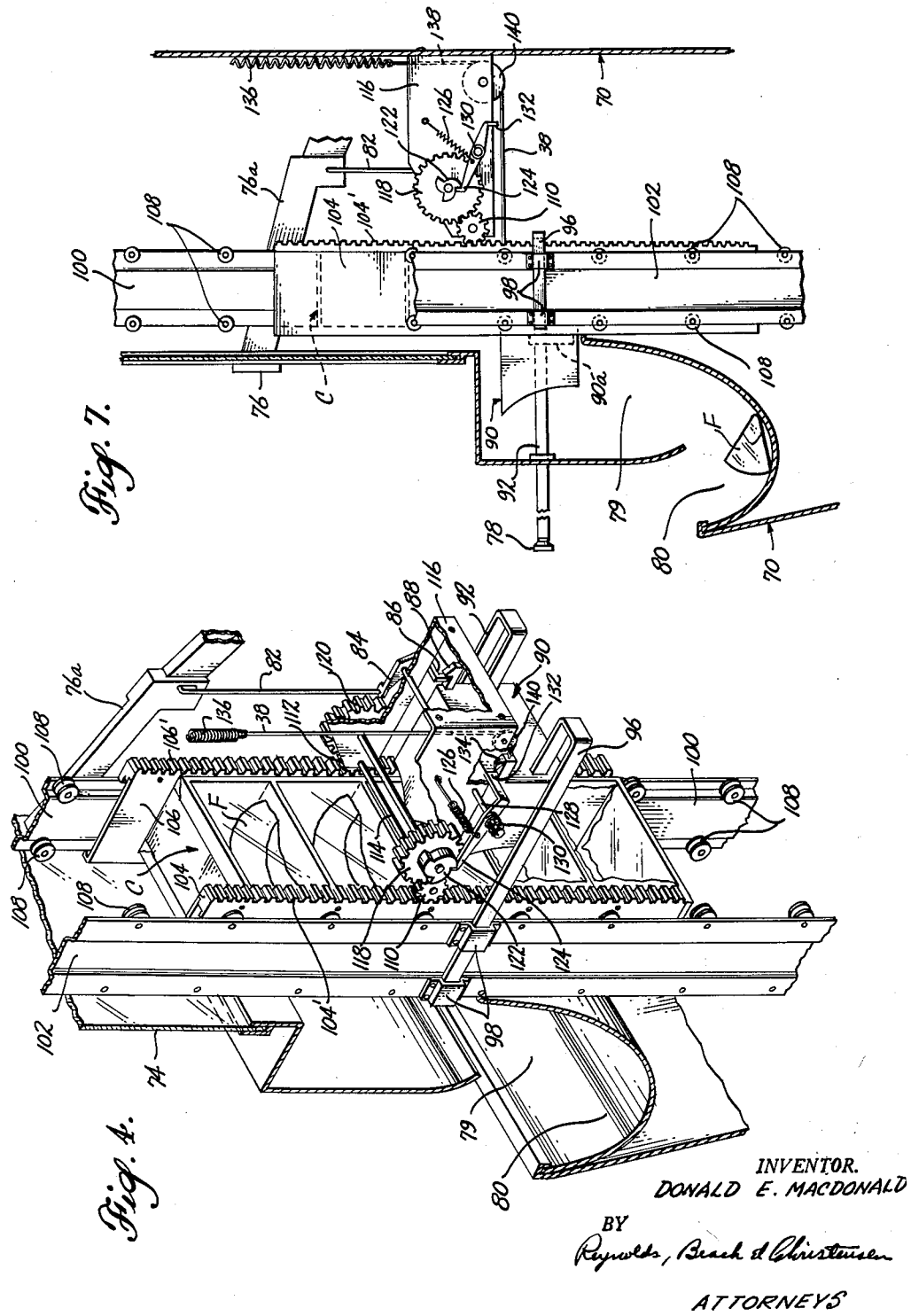
INVENTOR.
DONALD E. MACDONALD
BY
Reynolds, Beach & Christensen
ATTORNEYS

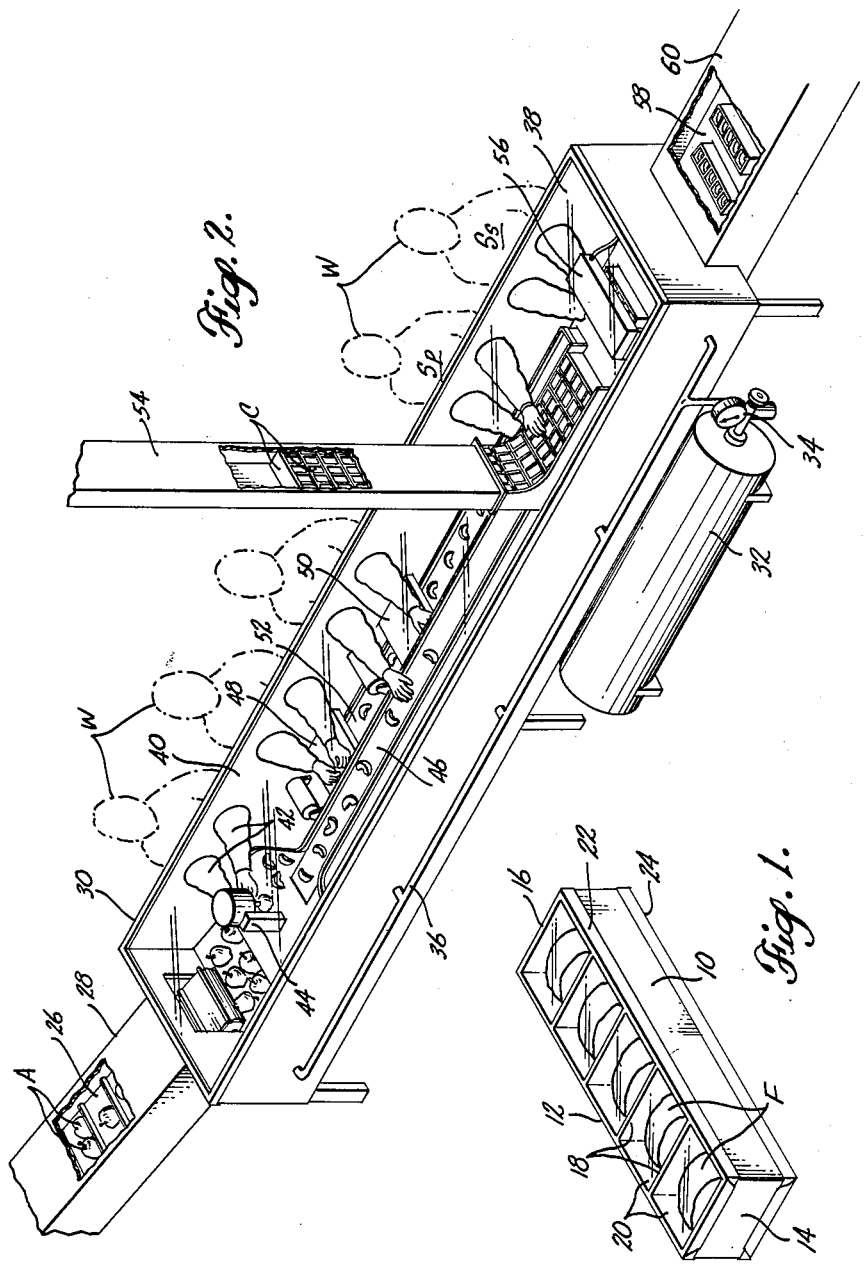

United States Patent Office 3,078,008
Patented Feb. 19, 1963

3,078,008
CONTAINER OF AND DISPENSER FOR
CUT-FRUIT SECTIONS
Donald E. MacDonald, P.O. Box 36, Leavenworth, Wash.
Filed Aug. 17, 1959, Ser. No. 834,241
9 Claims. (Cl. 221—31)

This invention relates to a new and improved process and apparatus for the packaging and dispensing of articles, particularly fruit cut in sections. The invention is herein illustratively described by reference to the presently preferred form thereof; however, it will be recognized that certain modifications and changes therein with respect to details may be made without departing from the underlying essentials.

Fruit, and particularly apples, has been sold for some time by use of coin-operated dispensing machines. In the past, whole apples were stored in the machine behind a viewing window. By refrigeration in the dispensing machine itself, the apples could be kept over substantial periods of time without appreciable spoilage, assuming they were in good condition when first placed in the machine. Frequently, however, poor apples would find their way into these machines and this fact would go undetected until the apple was actually purchased and cut open or bitten into by the consumer, because in many cases a poor apple has a bright and attractive skin. This is particularly true of apples which have been stored too long and have become mealy and dry or have actually begun to rot from the inside.

Another problem with such machines was the necessity for dispensing whole apples which, in many cases, would be considerably larger than the purchaser would desire and, in the case of choice apples, would be more expensive than could be afforded by small children or others wishing to make a lesser purchase. Further, many persons prefer to cut an apple before biting into it, and lacking a knife would usually pass up an apple dispensing machine for that reason. There has been no satisfactory way to store or dispense apples in sections, such as thirds, halves or quarters, in the case of larger, choice apples, due to the problem of discoloration and spoilage on contact with the atmosphere.

One of the objects of the present invention, therefore, is to provide a new and improved method and means for storing and dispensing fruit permitting the fruit to be packaged either whole or in sections without discoloration of the meat if sectionalized and without deleterious effect from atmospheric contact in either case. The invention provides a new and improved method for packaging such fruit or other foodstuff which effectively seals against entry of atmospheric air and permits viewing the contents of the container as well as permitting conveniently ejecting individual pieces or articles from the container, such as when the same is incorporated as a removable storage container in a dispensing machine.

Another object of the invention is an improved and relatively efficient and inexpensive packaging process for fruit and other foodstuffs subject to deleterious effect of atmospheric contact.

Still another object is an improved dispensing machine, coin-operated or otherwise, which may be made relatively inexpensively and which will permit convenient and inexpensive packaging and handling of the fruit or other foodstuff.

When packaged in accordance with this invention, apple sections, for example, may be viewed clearly through the window of their container so as to be inspected for condition. At relatively small expense, this packaging may be effected in such a manner that the exposed cut surfaces of the fruit are never in contact with atmospheric air until the package is opened by the act of the purchaser in operating the dispensing machine. In this way the refrigerated storage of the fruit, especially since it is held out of contact with air, may be prolonged either in the fruit storage house or in the dispensing machine itself without necessity of excluding the atmosphere from the machine or storage space as a whole, and the customers may purchase fruit sections in selected sizes at prices suiting them. For example, in a single machine there may be whole apples, half aples, or quarter apples available for purchase at prices corresponding to the amount desired to be purchased.

A feature of the invention resides in the provision of a container, preferably a multicell magazine-type container, comprising opposite side plates interconnected by end plates and intermediately by divider plates to define a plurality of cells with individual fruit sections contained within the respective cells, preferably individually wrapped, and with front and rear covering sheets of perforable, preferably transparent material, such as transparent plastic material, sealing the individual cell spaces against entry of atmospheric air and with inert gas contained therein. The fruit is cut in an atmosphere of inert gas, the cut sections are wrapped individually in such inert gas atmosphere and are then sealed in containers provided by this invention while still in the inert gas atmosphere. Preferably this working atmosphere of inert gas is under a pressure slightly above atmospheric pressure so that when the container is finally sealed, the same inert gas under such pressure is trapped within the container cells and is retained permanently therein until the cells are opened.

As a further feature of the invention, the dispensing machine, loadable by one or more such magazine-type containers, includes an ejector which carries means for perforating or cutting the front and rear cover sheets which close the container cells so as to permit passage of the ejector through the cells in order to eject the pieces of fruit therefrom. The dispensing apparatus further includes indexing means and coin-operated means for controlling operation of the ejector mechanism, the indexing means operating to position the next adjacent cell in line with the ejector with each operating movement of such ejector.

These and other features, objects and advantages of the invention will become more fully evident from the following description thereof by reference to the accompanying drawings.

FIGURE 1 is a perspective view of a multicell container in which cut and wrapped sections of fruit are stored in accordance with a preferred embodiment of the invention.

FIGURE 2 is a perspective view of a packing plant facility in which fruit is being cut, wrapped and packaged for dispensing in accordance with this invention.

FIGURE 3 is a perspective view of a dispensing machine in which the magazine-type containers may be stored for dispensing individual cut-fruit sections according to the invention.

FIGURE 4 is a rear perspective view of mechanism for dispensing the cut-fruit sections from the individual cells of the magazine-type container, the view showing parts broken away to illustrate details and illustrating the cooperative arrangement of the guides for the container and the coin-controlled ejector means.

FIGURE 5 is a top sectional view which illustrates the apparatus shown in FIGURE 4.

FIGURE 6 is a perspective view of the ejector plunger including the guide arms and actuating handle therefor.

FIGURE 7 is a side view of the apparatus shown in FIGURE 4.

Referring to the drawings, the magazine-type multi-cell container (FIGURE 1) comprises the elongated and generally rectangular side walls 10 and 12 interconnected at opposite ends by the end walls 14 and 16. The side walls are interconnected also at successive intermediate locations by the partitions or divider walls 18 to form a plurality of cell spaces 20 in which the cut-fruit sections F or other foodstuff articles may be stored. Preferably these individual pieces of fruit are separately wrapped in sheets of transparent plastic material such as "Saran," cellophane or similar materials. In addition, the front and rear (shown as top and bottom in FIGURE 1), normally open sides of the container are covered over by perforable sheet material 22 and 24, which is suitably bonded to the edges of the walls in order to seal the cell spaces against entry of atmospheric air. This sealing operation may be accomplished in any suitable manner, such as by adhesive bonding or by a process of heating the plastic sheet material 22 or 24 and pressing it against the container wall edges to form a bond with such edges by thermal activation of the sheet material. When the container is later re-used and re-packed, any pieces of material or adhesive which continue to cling to the wall edges can be removed by scraping them off or by dissolving them in a suitable solvent. To this end, it is preferred that the partition walls and the surrounding walls of the container be formed of a metal, although they may, of course, be of plastic or any other suitable material. Preferably, at least the sheet material 22 covering the front side of the container is transparent to permit viewing the contents thereof for use of the container in a dispensing machine as in FIGURE 3, to be described. If desired, the back side may also be transparent so that the container may be reversible in the dispensing machine or for other reasons.

In processing the fruit for packaging and dispensing according to the invention atmospheric air must be excluded from the time of cutting the fruit until it is contained in the sealed package. This is preferably accomplished by cutting, wrapping and packaging the fruit sections in an enclosure pressurized with inert gas which excludes atmospheric air. If apples, for example, are permitted to come into contact with air at all while being cut or after being cut, they, of course, turn brown and spoil more quickly. The natural moisture within the fruit is usually sufficient to prevent the same from drying out within the containers once the containers are adequately sealed against entry of air or loss of moisture. If desired, however, additional moisture may be incorporated in the containers in the form of droplets of water or in the form of sponge pads or the like which are previously soaked in water to provide a moist atmosphere within the container cells.

FIGURE 2 illustrates a typical packing facility in which fruit may be sectioned, wrapped and packaged for dispensing according to the invention. In this case the washed and selected fruit, such as the apples A, is delivered by conveyor 26 moving in a sealed or partially sealed housing 28 into the sealed working chamber 30 which is pressurized with a suitable inert gas such as carbon dioxide fed to the chamber from a pressure source 32 through pressure regulator apparatus 34 by way of the distribution pipes 36. The top or cover of this chamber 30 comprises a glass panel 38 through which the workers W may observe their activities. At the worker stations, the adjacent side wall 40 has a series of arm holes with built-in arm sleeves 42 through which the workers' arms may project into the interior of the space without permitting appreciable quantities of inert gas to escape from the chamber.

The arm holes in the wall are sufficiently large to allow freedom of movement of the arms and hands of the workers. At the initial or input end of the work chamber 30 is installed suitable means 44 for cutting the fruit into sections. Thereafter the cut sections advancing on the endless belt 46 are removed and wrapped in cellophane or other transparent wrapping material on the work tables 48 or 50 and deposited on the lower conveyor 52, where they advance to the packing station $S_p$ and are picked up by the operator there and deposited in the open cells of the magazine-type containers C (such as that shown in FIGURE 1) which are fed through the supply chute 54. Preferably the containers C have one side, such as the bottom side, already covered with the sealing sheet 24 when they are delivered through the supply chute 54. When the operator at the packing station $S_p$ fills the container, it is then removed by the operator at the sealing station $S_s$ and suitably covered and sealed by the transparent perforable cover sheet 22. If desired, a heat and pressure sealing device 56 may be used for this purpose which forms a continuous bond between the cover sheet 22 and the top edges of the four surrounding walls, preferably also the intermediate or divider walls of the container, so that each individual cell space is sealed off against escape or entry of gas or air as it leaves the packing chamber through the discharge conveyor 58. The discharge conveyor 58 is contained within an enclosing housing so as to prevent escape of pressurized gas. Suitable flaps, doors or gates at the ends of the input and output conveyors 28 and 58 may be provided (not shown) to permit ingress and egress of the articles without excessive loss of inert gas.

Inasmuch as the fruit is cut in an atmosphere of inert gas, is wrapped in that atmosphere and is then finally packed in sealed-off containers in that atmosphere, the cut surfaces of the fruit are never exposed to air and the container cell spaces will contain such gas at the pressure within the chamber 30, which pressure will remain within the containers and will prevent air from entering. The fruit is now in condition for indefinite storage in magazine containers which may be inserted directly in the dispensing machine to be described and later may be returned empty to the packing plant for refilling. The pressure of inert gas in the chamber 30 and hence in the magazine-type containers need be only slightly above atmospheric pressure in order to assure the maintenance of the desired packing and storage conditions. Consequently, there is no appreciable tendency for the thin and flexible cover films 22 and 24 to bulge outwardly under gas pressure to such an extent as to cause failures or produce inconveniences in orderly storage due to protruding surfaces.

In FIGURE 3 a simplified illustration of a suitable dispensing machine appears, including the refrigerated cabinet 70 (refrigeration apparatus not shown). The upper portion of this cabinet includes a display front 72 having a plurality of windows 74 behind which are mounted or installed the magazine-type containers C initially loaded with the cut-fruit sections, such sections being visible through the transparent cover sheets 22 of the containers and, of course, the transparent wrappings (where used) for the individual fruit sections within the container cells. Slotted coin receptacles 76 are provided along or adjacent the respective display windows, and actuating knobs 78 the locking mechanisms of which are released in response to deposit of a coin in the associated coin receptacle for operation to eject a fruit section. The fruit then is ejected from the selected container cell and drops through a chute 79 to the delivery opening 80 at the front of the cabinet (FIGURES 4 and 7). The details of the coin-operated mechanism controlling the ejector mechanism or, more specifically, permitting one actuation of the ejector mechanism in response to the deposit of the appropriate coin, is or may be of conventional design and requires no specific description herein.

In FIGURE 4 the coin-operated mechanism is shown simply as an inclined chute 76a along which the coins roll to a trip mechanism in which the weight or momentum of the coins cause actuation of a thrust rod 82 downwardly and thus tilt the lever arm 84 in a counterclockwise direction to lift the dog 86 from engagement with the tooth 88. The tooth 88 is mounted on the back side of the ejector unit 90, so that lifting of the dog 86 permits forward movement of ejector when drawn by the pull knob 78 acting through a draw rod 92. The rod 92 moves in a guide 94. A similar rod 96, lacking a handle, is mounted on the opposite side of the ejector unit 90 and moves in guides 98, the two rods and guides serving to guide the ejector 90 for translational movement in a horizontal line fore and aft of the machine, and in a direction transverse to the length of the vertically disposed magazine-type containers C.

The guides 94 and 98 are mounted on the frame strips 100 and 102 which extend vertically along opposite sides of the individual magazine containers C to support and guide the same incremental feed or indexing movement in conjunction with operation of the machine. Actually, the container C is preferably mounted in a guided carriage comprising opposite side plates 104 and 106 which move vertically on a series of guide rollers 108 carried by the respective frame strips 100 and 102.

The movable carriage 104, 106 has gear racks 104' and 106' formed along the rear edges thereof projecting free of the guide strips 100 and 102. These gear racks are engaged by the respective pinions 110 and 112 which are constrained to rotate together by a connecting shaft 114 journaled in the fixed sides of the U-shaped supporting bracket 116 which is suitably mounted in the display cabinet at a level just slightly above the level of the moving ejector unit 90. Also journaled upon and between the side plates of bracket 116 are the larger gears 118 and 120 meshed respectively with the pinions 110 and 112. The gears 118 and 120 turn together, and on the outer side of the gear 118 and rotatable therewith is a ratchet wheel 122. The teeth of this ratchet wheel are normally engaged by a dog formed on the end of a lever arm 124 which is urged against the peripheral surface of the ratchet wheel by a spring 126. This lever arm pivots on a fixed shaft 128 and normally pivots in a plane which is perpendicular to the shaft 128. However, there is a loose fit between the lever arm 124 and the shaft 128 which permits sidewise pivoting of such lever arm against the force of a retaining spring 130 normally holding the lever arm against a stop 131 and in perpendicular relationship to the shaft. The opposite end of the lever arm projects transversely to its length and carries a dog 132 which is engageable by a three-dimensional wedge-shaped cam element 134 mounted on the movable ejector unit 90. When the ejector unit is drawn forwardly by the associated pull knob 78 in order to eject a cut-fruit section from the container cell space aligned therewith, the wedge-shaped cam 134 engages the dog 132 and thus tilts the lever in a lateral sense (i.e., out of its normal plane perpendicular to the shaft 128). However, the ratchet wheel 122 is not disengaged at that time because the direction of tilt is toward the base of the wheel which is adjacent the outside face of the gear 118. Thus, while the cam element is permitted to pass by the dog 132 in order to permit the dispensing stroke of the ejector 90, the ratchet wheel 122, hence the gears 118, 120 and 110, 112 continue to be locked against rotation and the carriage 104, 106 is thus held against longitudinal movement in the guide strips 100 and 102. However, on the return movement of the ejector 90, effected by the return spring 136 acting through the cable 138 guided by the sheave 140, the sloping rear face of the wedge-shaped cam 134 causes the dog 132 to elevate in sliding over the cam and it thus depresses the opposite end of the lever 124 to disengage the ratchet wheel 122. At this time the cam is free to rotate by the angular increment representing the spacing between two successive teeth on such cam. Because of the gear ratio, this amount of rotation corresponds to descent movement of the container equal to the vertical width of the individual cell spaces in the magazine container C, and thus the magazine container is re-indexed to the next succeeding position for dispensing of the contents of the next cell. The weight of the carriage 104, 106 with the container C therein is sufficient to cause it to descend by the necessary indexing increment, as permitted by the ratchet mechanism described. Spring loading or other more positive means to effect that result may be used if desired.

The ejector proper as shown in FIGURE 6 comprises the plunger 90a adapted to enter the individual cell spaces in the magazine containers and push out the cut-fruit sections, following behind the advancing knife edges 90b which cut U-shaped flaps or openings in the sheet material 22 and 24 as the ejector advances toward the front of the machine. Preferably the knife edges 90b comprise the leading edges of a U-shaped strip which extends along the opposite sides and upper edge of the ejector perimeter and projects forwardly therefrom. The upper edge is pointed at an intermediate location and extends at an incline or bias therefrom to the opposite sides of the ejector, whereas the side cutting edges also extend at a bias in order to produce a more effective cutting or slicing action with minimum pressure exerted against the sheet material and minimum likelihood of disturbing the seal between the container edges and sheet material 22 or 24 covering the adjoining cell space. As the ejector advances against and into the cell spaces, cutting flaps in the cover sheets 22 and 24, the plunger 90a then pushes the cut-fruit section out of the cell and into the drop chute 78. Thereupon release of the plunger 78 permits the ejector to be retracted by recoil of the return spring 136.

These and other advantages, features and objectives of the invention will be evident to those skilled in the art based on an understanding of the description of the preferred embodiment thereof.

I claim as my invention:

1. In a fruit dispensing machine, a refrigerated display cabinet having a viewing front, a magazine-type multicell fruit display container mounted in said cabinet behind said viewing front, said display container having interconnected opposite side walls, top and bottom walls and successive intermediately located divider walls defining a plurality of fruit container cells, perforable sheet material covering the front and rear of the container and closing the cells, with inert gas contained therein to protect the fruit against entry of atmospheric air, at least the sheet material across the front of the container being transparent to permit viewing the fruit therein, a fruit ejector mounted for operating movement to eject fruit from a cell, means supporting and guiding such display container to permit indexing movement thereof following each operating movement of the ejector to eject fruit from one cell, and thereby align a next adjacent cell with said ejector, said fruit ejector having a plunger including cutter means operable to pierce the sheet material covering the cell front and rear, thereby to permit passage of the ejector plunger into and at least partly through the cell to eject the fruit therefrom.

2. In a fruit dispensing machine, a refrigerated display cabinet having a viewing front, a fruit display container mounted in said cabinet behind said viewing front, said display container having interconnected opposite side walls and top and bottom walls, perforable sheet material covering the front and rear of the container and closing the same, with inert gas contained therein to protect the fruit against entry of atmospheric air, at least the sheet material across the front of the container being transparent to permit viewing the fruit therein, a fruit ejector mounted for operating movement thereof to eject fruit from the container, said fruit ejector having a plunger including cutter means operable to pierce the sheet material covering the container front and rear, thereby to permit passage of the ejector plunger into and at least partly through the container to eject the fruit therefrom.

3. In an article dispensing machine, a display cabinet having a viewing front, a magazine-type multicell display container mounted in said cabinet behind said viewing front, said display container having interconnected opposite side walls, top and bottom walls and successive intermediately located divider walls defining a plurality of article container cells, perforable sheet material covering the front and rear of the container and closing the cells, at least the sheet material across the front of the container being transparent to permit viewing the articles therein, an article ejector mounted for operating movement thereof to eject an article from a cell, means supporting and guiding such display container to permit downward indexing movement thereof by gravity following each operating movement of the ejector to eject an article from one cell, and thereby align a next adjacent cell with said ejector, said ejector having a plunger including cutter means operable to pierce the sheet material covering the cell front and rear, thereby to permit passage of the ejector plunger into and at least partly through the cell to eject the article therefrom.

4. In an article dispensing machine, a display cabinet having a viewing front, a magazine-type multicell display container mounted in said cabinet behind said viewing front, said display container having interconnected opposite side walls, top and bottom walls and successive intermediately located divider walls defining a plurality of article container cells, perforable sheet material covering the front and rear of the container and closing the cells, at least the sheet material across the front of the container being transparent to permit viewing the articles therein, an article ejector mounted for operating movement thereof to eject an article from a cell, means supporting and guiding such display container and such ejector to permit indexing relative movement therebetween following each operating movement of the ejector to eject an article from one cell, and thereby align a next adjacent cell with said ejector, said ejector having a plunger including cutter means operable to pierce the sheet material covering the cell front and rear, thereby to permit passage of the ejector plunger into and at least partly through the cell to eject the article therefrom.

5. In a fruit dispensing machine, a refrigerated display cabinet having a viewing front, a fruit display container mounted in said cabinet behind said viewing front, said display container having interconnected opposite side walls and top and bottom walls and containing cut-fruit sections individually wrapped in transparent sheet material, said container further having perforable sheet material covering the front and rear of the container and closing the same, with inert gas contained therein and within said individual wrappings of said cut-fruit sections to protect the fruit against entry of atmospheric air, at least the sheet material across the front of the container being transparent to permit viewing the fruit therein, a fruit ejector mounted for operating movement thereof to eject fruit from the container, said fruit ejector having a plunger including cutter means operable to pierce the sheet material covering the container front and rear, thereby to permit passage of the ejector plunger into and at least partly through the container to eject the fruit therefrom.

6. In a fruit dispensing machine, a refrigerated display cabinet having a viewing front, a magazine-type multicell fruit display container mounted in said cabinet behind said viewing front, said display container having interconnected opposite side walls, top and bottom walls and successive intermediately located divider walls defining a plurality of fruit container cells, perforable sheet material covering the front and rear of the container and individually sealing the respective cells from atmospheric air by continuous bonded contact with the edges of the walls thereof at the front and rear of the container, said individual cells containing cut-fruit sections individually wrapped in flexible transparent sheet material, with inert gas contained in said cells and individual wrappings to protect the fruit against effects of atmospheric air, at least the sheet material across the front of the container being transparent to permit viewing the fruit therein, a fruit ejector mounted for operating movement to eject fruit from a cell, means supporting and guiding such display container to permit indexing movement thereof following each operating movement of the ejector to eject fruit from one cell, and thereby align a next adjacent cell with said ejector, said fruit ejector having a plunger including cutter means operable to pierce the sheet material covering the cell front and rear, thereby to permit passage of the ejector plunger into and at least partly through the cell to eject the fruit therefrom.

7. In combination, a magazine type, cut fruit container having side walls, top and bottom walls, and at least one partition wall extending between said top and bottom walls, said walls being impervious to air and sealed together to form a plurality of individually sealed cells, said top and bottom walls being of readily perforable material, a section of cut fruit in each of said cells, the cut surface of said fruit being normally subject to deleterious action by the atmosphere, a wrapper of impervious material sealed about each cut fruit section in its cell, gas non-deleterious to said cut surface within each wrapper, and gas non-deleterious to said cut surface within each cell, said cut surface being substantially non-deteriorated.

8. The combination of claim 7 wherein the said top wall and said wrapper are transparent, to form a magazine type display container.

9. The combination of claim 8 wherein the said bottom wall is also transparent.

References Cited in the file of this patent
UNITED STATES PATENTS

| | | |
|---|---|---|
| 154,553 | Kuh | Sept. 1, 1874 |
| 1,751,169 | Parker | Mar. 18, 1930 |
| 2,138,241 | Koch et al. | Nov. 29, 1938 |
| 2,571,340 | Carson | Oct. 16, 1951 |
| 2,606,704 | Nichols | Aug. 12, 1952 |
| 2,721,019 | Gauvreau | Oct. 18, 1955 |
| 2,858,224 | Darrah | Oct. 28, 1958 |
| 2,920,968 | Grandy | Jan. 12, 1960 |